United States Patent
Oono

(10) Patent No.: US 6,816,229 B2
(45) Date of Patent: Nov. 9, 2004

(54) IMAGE RECORDING DEVICE

(75) Inventor: Takehisa Oono, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/359,308

(22) Filed: Feb. 6, 2003

(65) Prior Publication Data

US 2003/0151729 A1 Aug. 14, 2003

(30) Foreign Application Priority Data

Feb. 6, 2002 (JP) .......................... 2002-029142

(51) Int. Cl.$^7$ .................. G03B 27/00; G03B 27/52; G03B 27/58; B65H 1/00; B65H 29/20
(52) U.S. Cl. ...................... 355/18; 355/40; 355/72; 271/8.1; 271/314
(58) Field of Search ............................ 355/18, 27, 28, 355/40, 72, 77; 396/612, 647; 347/264; 399/384, 388, 395, 396; 271/8.1, 314

(56) References Cited

U.S. PATENT DOCUMENTS 6,299,045 B1 * 10/2001 Hebert et al. ............... 226/90
6,459,469 B1 * 10/2002 Hebenstreit ................ 355/28
6,496,249 B2 * 12/2002 Nishimura et al. .......... 355/73

* cited by examiner

*Primary Examiner*—Alan Mathews
(74) *Attorney, Agent, or Firm*—Sughrue Mion, PLLC

(57) ABSTRACT

An image recording device for exposing a sheet of photosensitive material is disclosed. The device has a plurality of roller pairs disposed upstream and downstream with respect to a conveyance direction of the photosensitive material. The plurality of roller pairs nip and convey the photosensitive material, ensuring flatness of the material at an exposure position. The device also has a support member that supports a back surface of the photosensitive material. The device also has a plurality of pressing members, disposed between pressing roller pairs, which press the photosensitive material against the support member. The device also has a release mechanism which causes the nipping and release of nipping by at least one of the roller pairs and the pressing and release of pressing by the pressing member.

26 Claims, 10 Drawing Sheets

IMAGE RECORDING DEVICE

BACKGROUND OF THE INVENTION

1. Field of the Invention

The present invention relates to an image recording device that exposes a photosensitive material with light so as to form an image.

2. Description of the Related Art

Recently, a printing device utilizing digital exposure has been practically used. Namely, a digital photoprinter in which an image recorded in a photographic film is photo-electrically read, the read image is converted into a digital signal, then various image processings are performed for the digital signal so that the digital signal is converted into image data for recording, a photographic printing paper is scanned and exposed by recording light modulated in accordance with the resultant image data so that an image (latent image) is recorded on the photographic printing paper, and the photographic printing paper is subjected to development processing so as to be outputted as a print (photograph) has been practically used.

Such digital photoprinter is basically structured by an input device which has a scanner (image reading device) and an image processing device and an output device which has a printing device (image recording device) and a development device. The scanner photoelectrically reads projection light of image photographed in a photographic film by an image sensor such as a CCD sensor or the like and sends image data of the photographic film (image data signal) to an image processing device. The image processing device performs predetermined image processings for the image data and sends the resultant data as output image data for image recording (exposure condition). The printing device utilizing, for example, light beam scanning and exposure deflects light beam modulated in accordance with the supplied image data in a main scanning direction, and scans and conveys a photographic printing paper in a sub-scanning direction which is perpendicular to the main scanning direction, so that the photographic printing paper is scanned and exposed by the light beam, a latent image is formed and a back print is recorded. The development device performs predetermined development processings for the exposed photographic printing paper so as to produce a print that the image photographed in the photographic film is reproduced.

At this time, the image recording device cuts an elongated photographic printing paper wound in a roll by a predetermined length to produce a sheet of photographic printing paper and then main-scans the sheet by light beam while conveying the same in the sub-scanning direction. In this way, image recording is successively performed.

Further, the image recording device is provided with two pairs of conveyance rollers at conveyance direction upstream side and downstream side, respectively with an exposure position being interposed therebetween. By the roller pairs nipping the photographic printing paper, flatness of the photographic printing paper at the exposure position is ensured and the photographic printing paper is conveyed with high precision. As a result, excellent image recording is accomplished.

In order to ensure the flatness of photographic printing paper at the exposure position, the conveyance roller pairs disposed immediately before and after the exposure position are desirably disposed so as to be as close as possible to the exposure position. Nevertheless, there is a limit to dispose the conveyance roller pairs so as to be close to the exposure position depending on an arrangement of driving system for the conveyance roller pairs and a diameter of the rollers. Consequently, a leading edge of the photographic printing paper becomes free until the leading edge thereof passes through the conveyance roller pair disposed immediately before the exposure position and reaches the conveyance roller pair immediately after the exposure position, and thus exposure unevenness may occur because of curl of the photographic printing paper.

Then, a pressing roller with smaller diameter than the conveyance roller is disposed between the exposure position and the conveyance roller pair at the conveyance direction upstream side. By the pressing roller pressing the photographic printing paper against a guide plate, floating of the photographic printing paper at the exposure position can be suppressed and thus excellent image recording can be performed.

Specifically, as shown in FIG. 10 (referred to as conventional example 1 hereinafter), a sheet of photographic printing paper A is nipped by a conveyance roller pair 100 disposed at the conveyance direction upstream side and a conveyance roller pair 102 disposed at the conveyance direction downstream side with an exposure position P being interposed therebetween, and thus conveyed with high precision. Further, a back surface of the photographic printing paper is supported by a flutter guide 104 in a vicinity of the exposure position P and a pressing roller 106 disposed between the conveyance roller pair 100 and the exposure position P abuts against an emulsion surface of the photographic printing paper A. In this way, floating of the photographic printing paper A is prevented.

Japanese Patent Application Laid-Open (JP-A) No. 11-338060 (referred to as conventional example 2 hereinafter) discloses a structure that in order to ensure flatness of photographic printing paper, a fixing guide and a pressing roller are respectively disposed at the conveyance direction upstream side and the conveyance direction downstream side with an exposure position being interposed therebetween so as to be further toward the exposure position side than the conveyance roller pairs.

In accordance with the structure of conventional example 1, however, a distance from the exposure position P to a nip position of the conveyance roller pair 102 at the conveyance direction downstream side is long and thus a trailing edge of the photographic printing paper A may be curled subsequent to passing through the pressing roller 106 and image unevenness may occur.

Especially when the photographic printing paper is curled toward the side of emulsion surface (curled above), an amount of curl becomes large, which becomes a problem because unlike the back surface side, the emulsion surface side is not supported by the flutter guide.

In accordance with the structure of conventional example 2, since the fixing guide and the pressing roller are not moved from their pressing positions with respect to the photographic printing paper, the photographic printing paper may be vibrated when its leading edge enters under the fixing guide and the pressing roller or by impact caused by the trailing edge of the photographic printing paper passing through the fixing guide and the pressing roller. As a result, exposure unevenness may be generated at photographic printing paper being exposed.

SUMMARY OF THE INVENTION

The present invention was developed in light of the above-described facts, and an object of the invention is to provide an image recording device that is capable of recording an image with success by suppressing vibration of photosensitive material at an exposure position.

According to a first aspect of image recording device of the invention, an image recording device that exposes a sheet of photosensitive material with light so as to record an image, comprises a plurality of conveyance roller pairs that are disposed before and after an exposure position, nip and convey the photosensitive material so as to ensure flatness of the photosensitive material at the exposure position; a support member that supports a back surface of the photosensitive material before and after the exposure position; a plurality of pressing members that are respectively disposed, at least, between the conveyance roller pair disposed immediately before the exposure position and the exposure position and between the conveyance roller pair disposed immediately after the exposure position and the exposure position, and press the photosensitive material against the support member; and a release mechanism that performs nipping/nip-releasing of the conveyance roller pair and pressing/press-releasing of the pressing member.

According to the first aspect of the image recording device, the conveyance roller pairs nip the photosensitive material and convey the same, and thus the photosensitive material is exposed with light. In this way, an image is recorded on the photosensitive material. At this time, the conveyance roller pairs respectively disposed at the conveyance direction upstream side and the conveyance direction downstream side with the exposure position being interposed therebetween nip the photosensitive material and convey the same. Thus, flatness of the photosensitive material is ensured and an image is successfully recorded thereon. Since the pressing rollers are respectively disposed, at least, between the conveyance roller pair immediately before the exposure position and the exposure position and between the conveyance roller pair immediately after the exposure position and the exposure position, the photosensitive material can be pressed against the support member side at further toward the exposure position side than the respective nip positions of the conveyance roller pairs, and floating of the photosensitive material at the exposure position can be prevented and thus excellent image recording can be performed.

Further, until a leading edge of the photosensitive material passes through the conveyance roller pair and the pressing member further toward the conveyance direction downstream side than the exposure position, the conveyance roller pair does not nip the photosensitive material and the pressing member is retracted from its pressing position. Thus, it is possible to prevent that the leading edge of the photosensitive material abuts nipping conveyance roller pair and the pressing member at the pressing position and thus the photosensitive material being exposed is vibrated, resulting in exposure unevenness.

Similarly, before a trailing edge of the photosensitive material reaches the conveyance roller pair and the pressing member further toward the conveyance direction upstream side than the exposure position, nipping of the conveyance roller pair is released and the pressing member is retracted from the pressing position. Thus, it is possible to prevent that the photosensitive material being exposed is vibrated by impact caused by the trailing edge of the photosensitive material being removed from nipping conveyance roller pair and the pressing member at the pressing position and thus exposure unevenness may occur.

According to a second aspect of image recording device of the invention, an image recording device that exposes a sheet of photosensitive material with light so as to record an image, comprises a plurality of conveyance roller pairs that are disposed before and after an exposure position, nip the photosensitive material and convey the same; a support member that supports a back surface of the photosensitive material before and after the exposure position; a plurality of pressing members that are respectively disposed, at least, between the conveyance roller pair disposed immediately before the exposure position and the exposure position and between the conveyance roller pair disposed immediately after the exposure position and the exposure position and press the photosensitive material against the support member; and a release mechanism that performs nipping/nip-releasing of the conveyance roller pair and pressing/press-releasing of the pressing member, wherein the support member is such that its support surface which supports a back surface of the photosensitive material is curved inside in a conveyance direction.

According to the second aspect of the image recording device, even if the photosensitive material which is curled with its image recording surface side being inner side (reversely curled) reaches the exposure position, the photosensitive material can be pressed against the support surface by the pressing member and conveyed because the support surface of support member supporting a back surface of the photosensitive material is formed so as to be curved inner side in the conveyance direction. Thus, reversely curled photosensitive material can be conveyed along the support surface and its floating at the exposure position can be suppressed. Consequently, excellent image recording without exposure unevenness can be performed.

According to a third aspect of image recording device of the invention, a direction of nip-releasing of the conveyance roller pair is directed in a direction of normal with respect to the support surface.

According to the third aspect of the image recording device, a direction of normal with respect to the support surface of curved support member is directed in a direction of nip-releasing of the conveyance roller pair. Thus, an amount that the conveyance rollers (at the respective nip positions) protrude with respect to the support surface can be minimized. Further, vibration generated at a time when the leading edge or the trailing edge of the photosensitive material passes on the conveyance rollers can be suppressed, and thus excellent image recording can be performed.

According to a fourth aspect of image recording device of the invention, the release mechanism releases nipping of the conveyance roller pair further toward the conveyance direction upstream side than the exposure position and pressing of the pressing member further toward the conveyance direction upstream side than the exposure position before a trailing edge of photosensitive material being exposed reaches the conveyance roller pair and the pressing member.

According to the fourth aspect of the image recording device of the invention, the release mechanism releases nipping of the conveyance roller pair further toward the conveyance direction upstream side than the exposure position and pressing of the pressing member further toward the conveyance upstream side than the exposure position before the trailing edge of the photosensitive material being exposed reaches the conveyance roller pair and the pressing member. Thus, it is possible to reliably prevent that the photosensitive material being exposed is vibrated by impact caused by the trailing edge of the photosensitive material being removed from nipping conveyance roller pair and the pressing member at the pressing position and exposure unevenness may occur.

According to a fifth aspect of image recording device of the invention, after the release mechanism releases nipping of the conveyance roller pair further toward the conveyance direction upstream side than the exposure position before the trailing edge of the photosensitive material being exposed reaches the conveyance roller pair, the pressing member further toward the exposure position side than the conveyance roller pair presses the photosensitive material on the support member.

According to the fifth aspect of the image recording device, even after the releasing means releases nipping of the conveyance roller pair further toward the conveyance direction upstream side than the exposure position before the trailing edge thereof reaches the conveyance roller pair, the pressing member further toward the exposure position than the conveyance roller pair presses the photosensitive material just before the trailing edge of the photosensitive material reaches the pressing member. As a result, floating of the trailing edge of the photosensitive material which has passed through the conveyance roller pair can be minimized, and thus excellent image recording can be performed.

According to a sixth aspect of image recording device of the invention, the release mechanism releases nipping of the conveyance roller pair further toward the conveyance direction downstream side than the exposure position and pressing of the pressing member further toward the conveyance direction downstream side than the exposure position before a leading edge of the photosensitive material being exposed reaches the conveyance roller pair and the pressing member.

According to the sixth aspect of the image recording device, the release mechanism releases nipping of the conveyance roller pair further toward the conveyance direction downstream side than the exposure position and pressing of the pressing member further toward the conveyance direction downstream side than the exposure position before the leading edge of the photosensitive material being exposed reaches the conveyance roller pair and the pressing member. Thus, it is possible to reliably prevent that the photosensitive material being exposed is vibrated by impact caused by the leading edge of the photosensitive material abutting nipping conveyance roller pair and the pressing member at the pressing position and thus exposure unevenness may occur.

According to a seventh aspect of image recording device of the invention, in accordance with the release mechanism, before the conveyance roller pair further toward the conveyance direction downstream side than the exposure position nips the photosensitive material, the pressing member further toward the exposure position side than the conveyance roller pair which the leading edge of the photosensitive material reaches presses the photosensitive material on the support member.

According to the seventh aspect of the image recording device, the pressing member is disposed further toward the exposure position than the conveyance roller pair further toward the conveyance direction downstream side than the exposure position is. Thus, when the leading edge of the photosensitive material passes through the pressing member even if it does not reach the conveyance roller pair, the pressing member firstly presses the photosensitive material. Thus, floating of the photosensitive material at the exposure position can be minimized and excellent image recording can be accomplished.

The image recording device of eighth aspect of the invention further comprises a guide member that is disposed in a vicinity of the pressing member, prevents floating of the photosensitive material, guides the photosensitive material under the pressing member or between the conveyance roller pair and is moved integrally with the pressing member by the release mechanism.

According to the eighth aspect of the image recording device of the invention, since the guide member is provided in a vicinity of the pressing member, floating of the leading edge of the photosensitive material which has been removed from the conveyance roller pair can be suppressed and guided under the pressing member. Alternatively, floating of the leading edge of the photosensitive material which has been removed from the pressing member can be suppressed and guided between the conveyance roller pair.

Further, the guide member is moved integrally with the pressing member. Thus, when pressing of the photosensitive material by the pressing member is released, the guide member is moved away from the photosensitive material. Thus, for example, it is possible to prevent the trailing edge of the photosensitive material being exposed with its pressing being released from slide-contacting the guide member and such slide-contact from affecting an exposure state.

According to a ninth aspect of image recording device of the invention, the pressing member is a rotatable roller that abuts an image recording surface of the photosensitive material and presses the same against the support member.

According to the ninth aspect of the image recording device, the pressing member which presses the photosensitive material against the support member is a rotatable roller which abuts an image recording surface. Thus, when the roller presses the photosensitive material, it is rotated in accordance with conveyance of the photosensitive material. Accordingly, it is possible to prevent the pressing member (roller) from damaging the image recording surface of the photosensitive material.

According to a tenth aspect of image recording device of the invention, the pressing member comprises a pressing surface that abuts an image recording surface of the photosensitive material and presses the same against the support member which supports a back surface of the photosensitive material, and the pressing surface is formed of member with low slide friction.

According to the tenth aspect of the image recording device, the pressing surface slide-contacting the photosensitive material of the pressing member which presses the photosensitive material against the support member is made of member with low slide friction. Thus, it is possible to prevent the image recording surface of the photosensitive material from being damaged by slide generated by the pressing member pressing the image recording surface of the photosensitive material. The member with low slide friction refers to as a member that a slide friction of surface slide-contacting the photosensitive material is so low that the image recording surface of the photosensitive material is not damaged.

DESCRIPTION OF THE PREFERRED EMBODIMENTS

An image recording device of the present invention will be described hereinafter in detail on a basis of preferred embodiments thereof shown by the attached drawings. Firstly, an overall description will be given of the image recording device and then a sub-scanning-and-conveying section which is a main portion will be described.

(Overall Structure of Image Forming Device)

Figure 1:
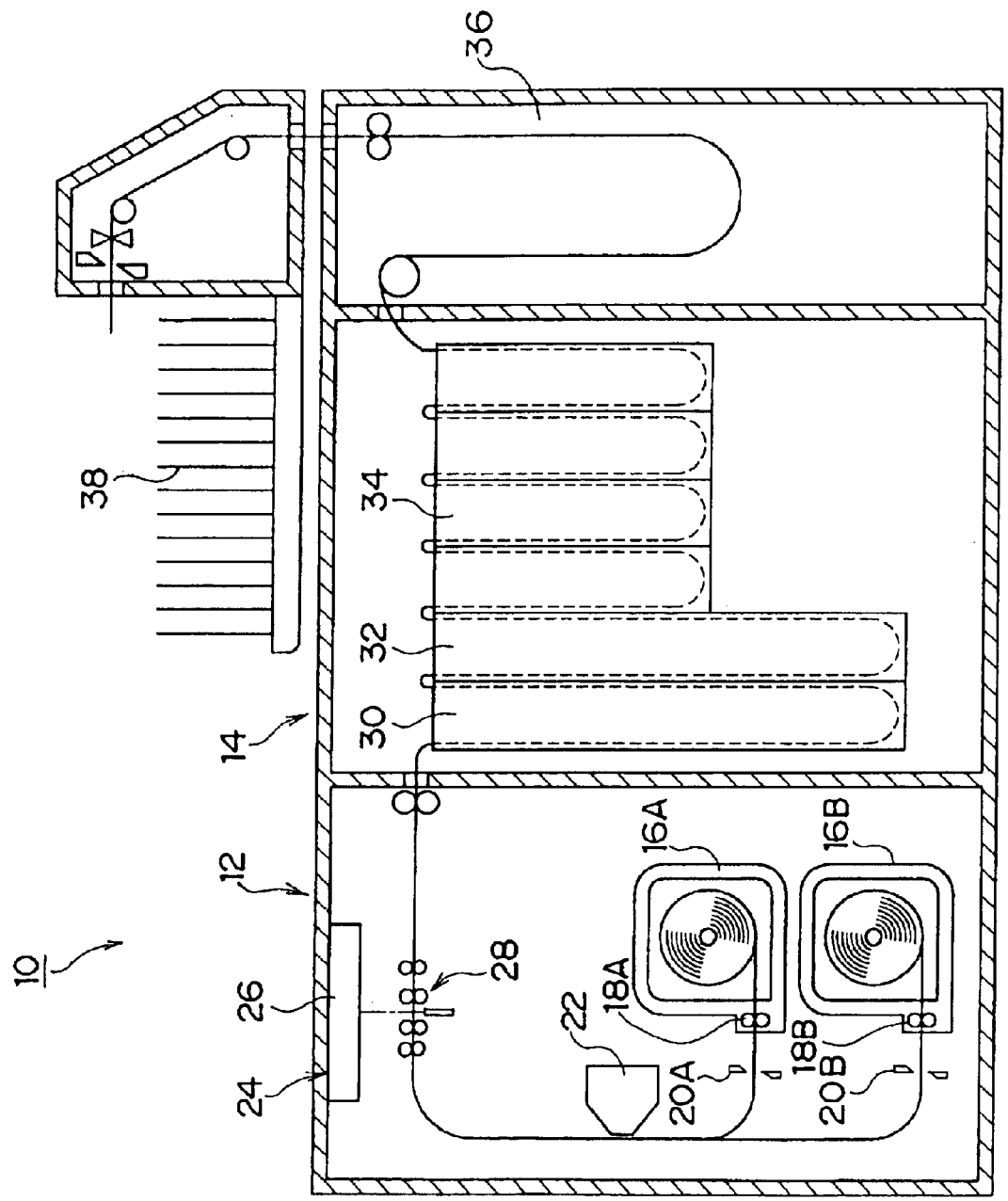
FIG. 1 is a schematic explanatory view of image recording device relating to an embodiment of the present invention.

An image forming device 10 is, as shown in FIG. 1, mainly utilized for image formation for digital photoprinter. The image forming device 10 is formed by an image recording device 12 that scans/exposes a photographic printing paper A with light beam L in accordance with exposure condition determined by a setup device in accordance with image information read by an image reading device such as a film scanner or the like to form a latent image and a processor 14 that performs a development processing for the photographic printing paper A with the latent image being formed thereon and outputs a photographic print with an image of the photographic film being recorded thereon.

Magazines 16A and 16B in each of which the photographic printing paper A wound in a roll is accommodated are disposed in the image recording device 12. The photographic printing paper A pulled out from either of the magazines 16A and 16B by either of pull-out roller pairs 18A and 18B is cut by either of cutters 20A and 20B by a predetermined length. In this way, a sheet of the photographic printing paper A is produced.

A back print section 22 for printing predetermined information on a back surface of the photographic printing paper A is disposed at the downstream side in the conveying path for the sheet of photographic printing paper A. An exposure section 24 that records a predetermined image onto an emulsion surface of the photographic printing paper A is disposed at the downstream side of the back print section 22.

The exposure section 24 includes a photo-scanning device 26 that exposes the photographic printing paper A with light on a basis of the predetermined image information and a sub-scanning-and-conveying section 28 that conveys the photographic printing paper A at an exposure position with high precision and ensures flatness of the photographic printing paper.

A development tank 30, a fixing tank 32, a washing tank 34 and a drying section 36 are disposed along a conveying path within the processor 14 into which the photographic printing paper A with a predetermined image being recorded thereon at the exposure section 24 is conveyed. By the photographic printing paper A successively passing through such tanks and section, a photographic print is produced and the resultant photographic print is outputted to a sorter 38.

(Structure of Sub-Scanning-and-Conveying Section)

The sub-scanning-and-conveying section 28 of the image recording device 12 with the above-described structure will be described in detail.

Figure 2:
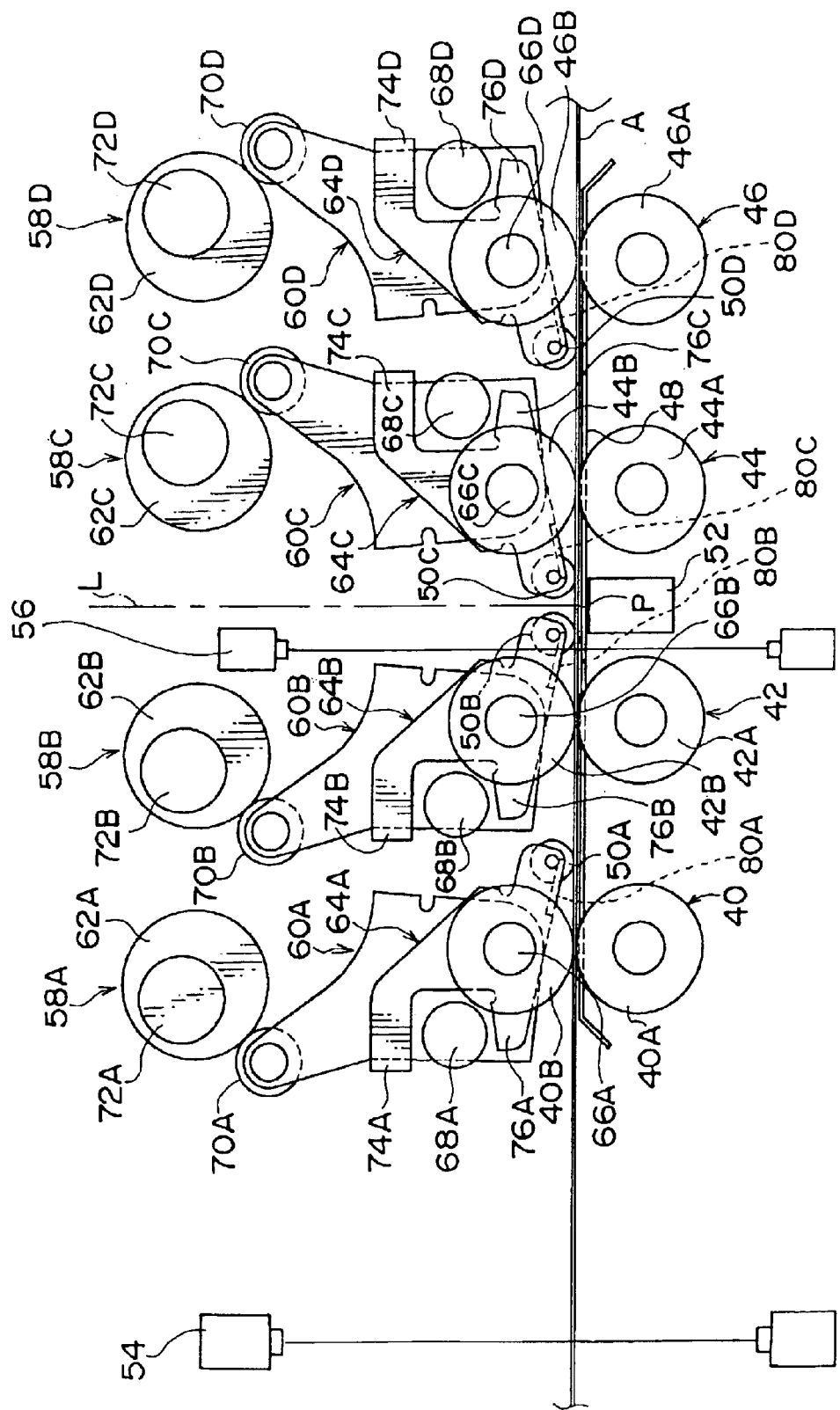
FIG. 2 is a schematic side view of exposure section relating to a first embodiment of the invention.

As shown in FIG. 2, in order to convey with high precision the photographic printing paper A subjected to image recording with laser beam L from the photo-scanning device 26, the sub-scanning-and-conveying section 28 is provided with, as seen from the side, two pairs of conveyance rollers 40 and 42 before the exposure position P and two pairs of conveyance roller pairs 44 and 46 after the exposure position (the conveyance roller pairs 40, 42, 44 and 46 may be referred hereinafter to as conveyance roller pairs 40 to 46).

The conveyance roller pairs 40 to 46 are respectively formed by driving rollers 40A to 46A at the lower side and nip rollers 40B to 46B at the upper side. The nip rollers 401B to 46B are structured so as to be capable of freely nipping/nip-releasing relative to the driving rollers 40A to 46A by nip releasing mechanisms 58A to 58D to be described later. Pressing rollers 50A to 50D that are structured so as to be freely switched, in cooperation with the nip rollers 40B to 46B, between a pressing position that the photographic printing paper A is pressed against a flutter guide 48 to be described later and a released position that the photographic printing paper is set apart from the flutter guide 48 are respectively disposed at the nip rollers 40B to 46B at the side of exposure position P.

As shown in FIG. 2, the flutter guide 48 that is formed in a flat plate shape and supports a back surface of the photographic printing paper A to ensure its flatness is disposed between the conveyance roller pairs 40 to 46 by being supported by a support member 52.

A light transmitting sensor 54 is disposed further toward the conveyance direction upstream side than the conveyance roller pair 40 is. A light transmitting sensor 56 is disposed immediately before the exposure position P. The light transmitting sensors 54 and 56 detect a leading edge and a trailing edge of the photographic printing paper A and thus control timings of nipping/nip releasing of the conveyance roller pairs 40 to 46, so that exposure unevenness is suppressed.

Structures of the aforementioned nip releasing mechanisms 58A to 58D will be described. Since the nip releasing mechanisms 58A to 58D have the same structure, the nip releasing mechanism 58A will be described as a representative and descriptions of other mechanisms will be omitted.

The nip releasing mechanism 58A is provided at opposite end portions of the nip roller 40B, performs nipping/nip-releasing of the nip roller 40B with respect to the driving roller 40A and moves the pressing roller 50A so as to approach or away from the flutter guide 48.

Figure 3:
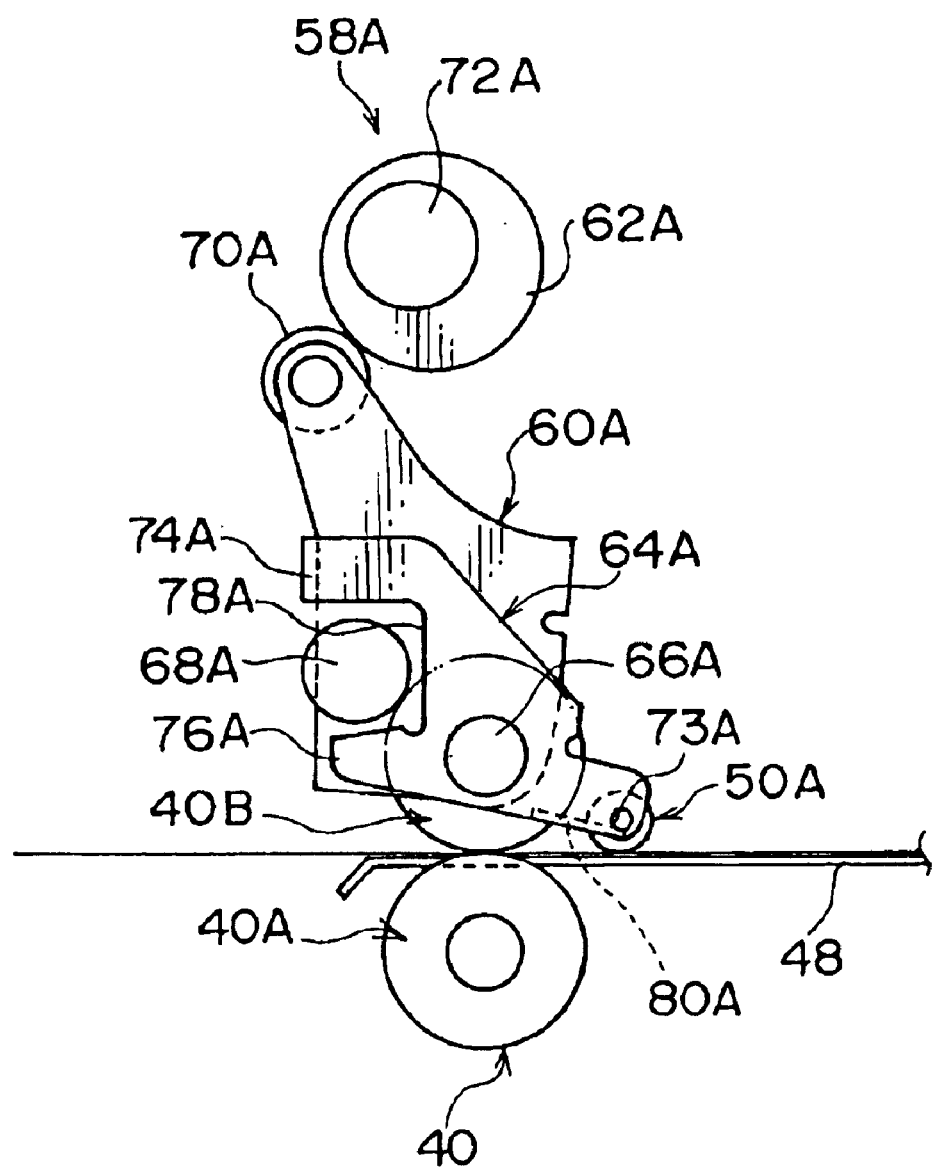
FIG. 3 is a schematic side view showing a state of nipping of nip releasing mechanism relating to the first embodiment of the invention.

As shown in FIG. 3, the nip releasing mechanism 58A is basically formed of a swing member 60A which swingably supports the nip roller 40B, an eccentric cam 62A which displaces the swing member 60A and a swing member 64A which displacably holds the pressing roller 50A in cooperation with displacement of the swing member 60A.

The swing member 60A axially supports an end portion of rotating shaft 66A of the nip roller 40B and can rotate about a rotating shaft 68A. A helical spring is wound around the rotating shaft 68A and thus the swing member 60A is biased in a clockwise direction on the figure, i.e., in a direction that the nip roller 40B nips with the driving roller 40A. Further, an abutment portion 70A which is axially supported by the swing member 60A and abuts the eccentric cam 62A is provided at an upper end of the swing member 60A. The abutment portion 70A always abuts the eccentric cam 62A by the aforementioned biasing force.

The eccentric cam 62A rotates about a rotating shaft 72A, rotates the swing member 60A in a counter-clockwise direction against the biasing force and thus releases nip of the nip roller 40B.

The swing member 64A axially supports opposite end portions of rotating shaft 73A of the pressing roller 50A and can swing about a rotating shaft 66A of the nip roller 40B. Further, the swing member 64A is biased in a clockwise direction on the figure by biasing force of helical spring wound around the rotating shaft 66A. The swing member 64A is provided with protrusions 74A and 76A at the opposite side of the rotating shaft 66A with respect to the pressing roller 50A. A rotating shaft 68A is accommodated within a concave portion 78A formed between the protrusions 74A and 76A. Thus, at a time of nip-releasing, the protrusion 76A of the swing member 64A biased in a clockwise direction abuts the rotating shaft 68A (see FIG. 5). The protrusion 76A restricts an amount of rotation of the swing member 64A in accordance with nip-releasing operation of the nip roller 40B and moves the pressing roller 50A away from the flutter guide 48 (see FIG. 5).

A guide member 80A that is formed in a flat plate shape and guides the photographic printing paper A under the pressing roller 50A is disposed between a pair of swing members 64A axially supporting the pressing roller 50A. The guide member 80A is formed in a configuration that does not interfere with the nip roller 40B and the pressing roller 50A.

The conveyance roller pairs 42 to 46 have the same structure as that of the conveyance roller pair 40, and the pressing rollers 50B to 50D have the same structure as that of the pressing roller 50A.

Figure 4:
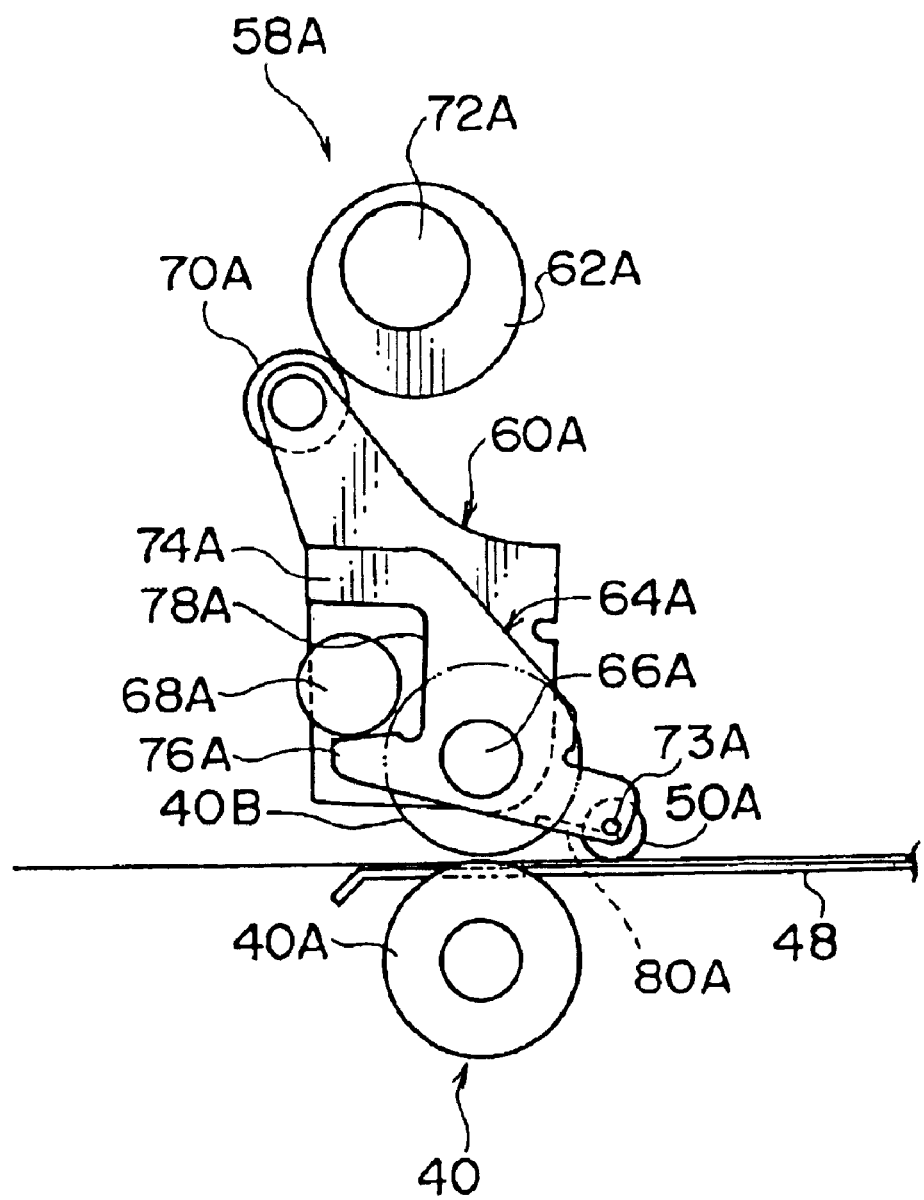
FIG. 4 is a schematic side view showing a state of pressing of the nip releasing mechanism relating to the first embodiment of the invention.

In the following description, a state of FIG. 3 may be referred to as a nip position, a state of FIG. 4 may be referred to as a pressing position and a state of FIG. 5 may be referred to as a released position.

The image recording device 12 include an unillustrated control section. The control section controls the nip releasing mechanisms 58A to 58D on a basis of detected signal of the sensors 54 and 56 and exposure of the photo-scanning device 26.

An operation of the image recording device 12 with the above-described structure will be described.

When image information is inputted to the image recording device 12, the photographic printing paper A is pulled out by a predetermined length by the pull-out roller 18A from a magazine in which the photographic printing paper A with a width corresponding to the image information is accommodated, for example, the magazine 16A. The pulled out photographic printing paper A is cut by the cutter 20A. In this way, a sheet of the photographic printing paper A with a predetermined size is produced.

A back surface of the sheet of the photographic printing paper A is printed at the back print section 22 and then the sheet reaches the sub-scanning-and-conveying section 28.

A conveying method in the sub-scanning-and-conveying section 28 (method for ensuring flatness of the photographic printing paper A) will be described hereinafter in detail with reference to sequences of nipping/nip-releasing of the conveyance roller pairs 40 to 46 shown in FIGS. 6A to 8M. In the drawings, the flutter guide 48 is not shown. Although photographic printing papers A1 to A4 successively conveyed are shown in FIGS. 6A to 8M, only the photographic printing paper A2 will be described for convenience of explanation.

Firstly, on a basis of timing that the sensor 54 detects a leading edge of photographic printing paper, the nip roller 40B nips with the driving roller 40A by driving the nip releasing mechanism 58A before the leading edge of the photographic printing paper A2 reaches the position of the conveyance roller pair 40. Further, the pressing roller 50A is abutted against the flutter guide 48 (see FIGS. 6A and 6B).

A driving motor (not shown) of the nip releasing mechanism 58A is driven on a basis of drive signal from the control section and the eccentric cam 62A is rotated counter-clockwise about the rotating shaft 72A by a predetermined angle. Thus, the swing member 60A which is biased clockwise by a helical spring is rotated clockwise about the rotating shaft 68A, so that the nip roller 40B axially supported by the rotating shaft 66A nips with respect to the driving roller 40A (see FIG. 3). At this time, before the nip roller 40B abuts the driving roller 40A, the pressing roller 50A axially supported by the swing member 64A abuts the flutter guide 48 (see FIG. 4). Since movement of the pressing roller 50A is restricted by the flutter guide 48 thereafter, in accordance with clockwise rotation of the swing member 60A, the swing member 64A is rotated counter-clockwise about the rotating shaft 66A and the protrusion 76A is moved away from the rotating shaft 68A (see FIG. 3).

Figure 6A:
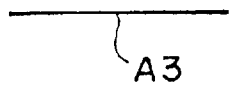
FIGS. 6A through 6D are explanatory views showing states of controlling nip of conveyance roller pairs in a sub-scanning-and-conveying section.
Figure 6A:
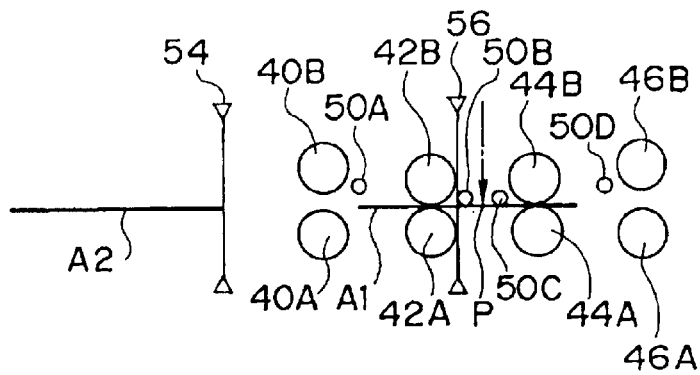
Figure 6B:
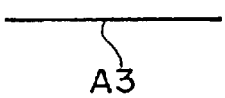
Figure 6B:
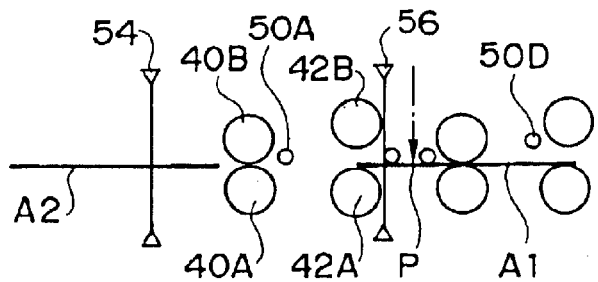
Figure 6C:
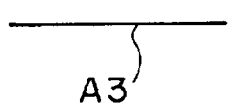
Figure 6C:
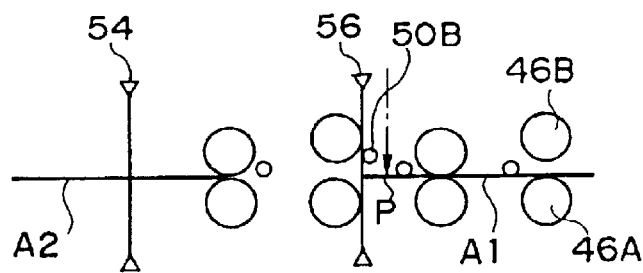

The photographic printing paper A2 enters between nipping conveyance roller pair 40 (see FIG. 6C).

Figure 6D:
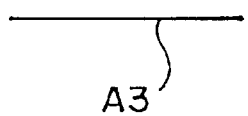
Figure 6D:
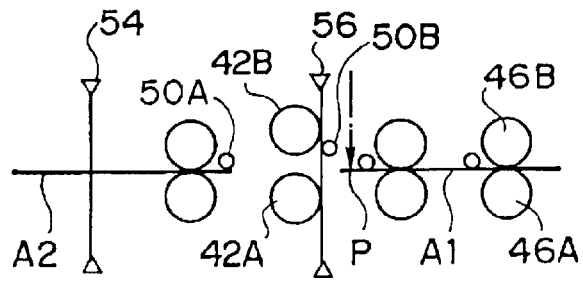

Since a portion of the photographic printing paper A2 that has passed through the conveyance roller pair 40 is guided under the pressing roller 50A by the guide member 80A and pressed against the flutter guide 48 by the pressing roller 50A, floating of the portion of the photographic printing paper A2 caused by its curl is prevented (see FIG. 6D). Because the pressing roller 50A is rotatable about the rotating shaft 73A, it is rotated in accordance with abutment against the photographic printing paper A2. Thus, it is possible to prevent an emulsion surface of the photographic printing paper A2 from being scratched because of slide of the pressing roller 50A.

Figure 7E:
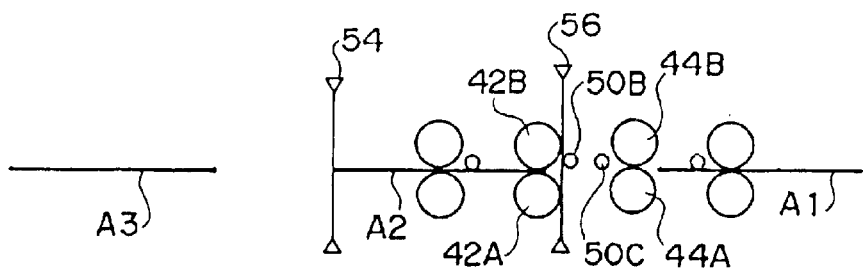
FIGS. 7E through 7I are explanatory views showing states of controlling nip of the conveyance roller pairs in the sub-scanning-and-conveying section.

Further, the nip roller 42B structuring the conveyance roller pair 42 nips with respect to the driving roller 42A (see FIG. 7E).

Consequently, the photographic printing paper A2 enters the conveyance roller pair 42 and is securely nipped thereby. Further, the photographic printing paper is guided under the pressing roller 50B by the guide member 80B and its floating is suppressed by the pressing roller 50B (see FIG. 7F).

Figure 7F:
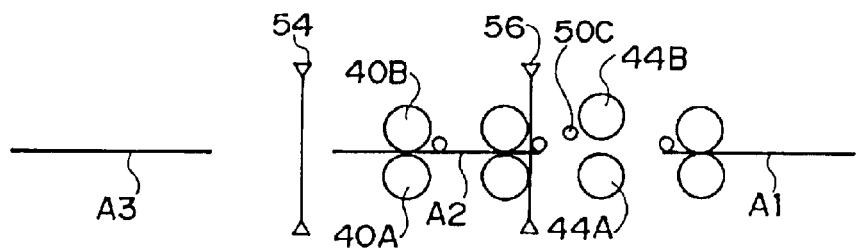

On the other hand, nipping of the conveyance roller pair 44 is released by the nip releasing mechanism 58C before the photographic printing paper A2 reaches the conveyance roller pair 44 (see FIG. 7F). Specifically, a driving motor of the nip releasing mechanism 58C is driven on a basis of drive signal outputted from the control section at a predetermined timing, and then the eccentric cam 62C is rotated clockwise. Thus, the eccentric cam 62C presses the abutment portion 70C of the swing member 60C. As a result, the swing member 60C is rotated counter-clockwise about the rotating shaft 68C and the nip roller 44B is moved away from the driving roller 44A (see FIG. 5). At this time, even if the swing member 60C is rotated counter-clockwise and the nip roller 44B is moved away from the driving roller 44A, the swing member 64C is rotated clockwise so as to maintain the pressing roller 50C at a pressing position (see FIG. 4). Nevertheless, after the protrusion 76C abuts the rotating shaft 68C and rotation of the swing member 64C is restricted, the swing member 64C is moved together with the swing member 60C, and the pressing roller 50C is moved away from the flutter guide 48C (see FIG. 5).

As described above, nipping of the conveyance roller pair 44 is released before the photographic printing paper A2 reaches the conveyance roller pair 44, and the pressing roller 50C is moved away from the flutter guide 48 (pressing of the pressing roller 50C is released). This is because an impact generated when a leading edge of the photographic printing paper A2 abuts nipping conveyance roller pair 44 or the pressing roller 50C at a pressing position is transmitted as vibration to photographic printing paper A2 being exposed, and thus exposure unevenness may occur. Thus, generation of the aforementioned vibration can be prevented before the leading edge of the photographic printing paper A2 reaches the respective positions of the pressing roller 50C and the conveyance roller pair 46, and excellent image recording can be performed (see FIG. 7G).

The photographic printing paper A2 is scanned with laser light from the photo-scanning device 26 with a timing that the sensor 56 detects the leading edge of the photographic printing paper A2 being a reference, and an image (latent image) is recorded two-dimensionally on the photographic printing paper A2 which has reached the exposure position (see FIGS. 7G through 8L).

At this time, the photographic printing paper A which has passed through the exposure position P becomes free because the pressing roller 50C is retracted from the pressing position. Nevertheless, the conveyance roller pair 42 at the conveyance direction upstream side nips the photographic printing paper A and the pressing roller 50B which is closer to the exposure position P than the conveyance roller pair 42 suppresses floating of the photographic printing paper A2. Thus, image recording can be performed with high precision (see FIG. 7G).

Figure 7G:
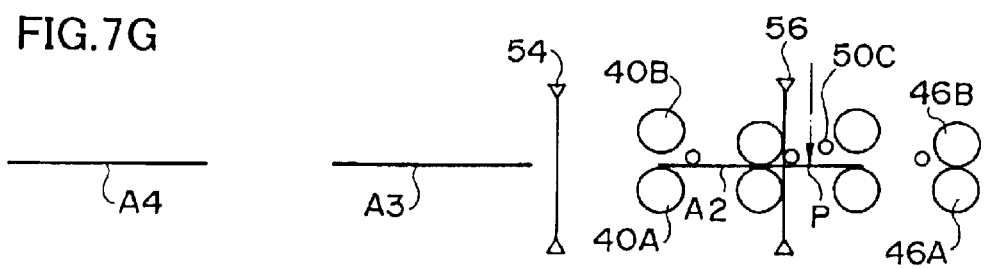

On the other hand, nipping of the conveyance roller pair 40 is released before a trailing edge of the photographic printing paper A2 passes through the conveyance roller pair 40 (see FIG. 7G). This is in order to prevent vibration of the photographic printing paper A2 caused by impact generated when the trailing edge of the photographic printing paper A2 passes through nipping conveyance roller pair 40 from affecting exposure state. Specifically, a driving motor is driven to move the eccentric cam 62A from a nip position to a pressing position. In this way, nipping of the nip roller 40B is released.

Figure 7H:
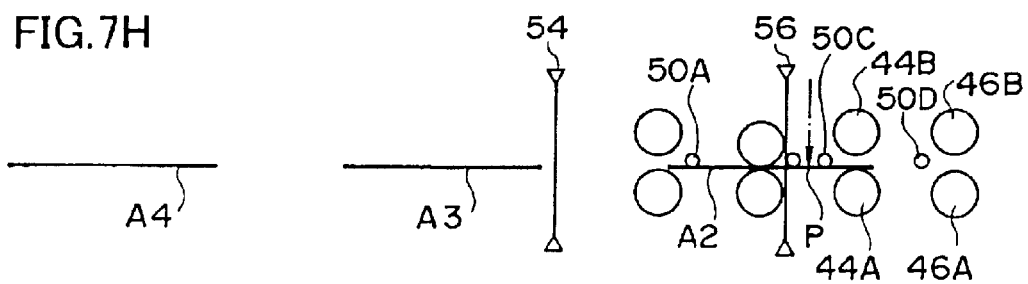
Figure 7I:
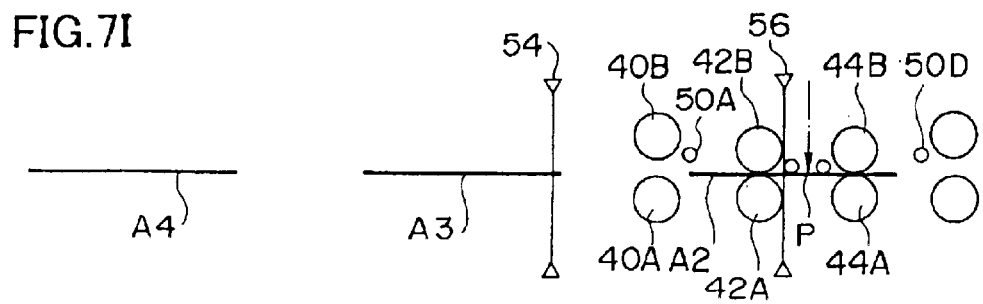

After the leading edge of the photographic printing paper A2 passes through the position of pressing roller 50C, the pressing roller 50C is descended on the flutter guide 48 (moved from a released position to a nip position) Further, after the leading edge of the photographic printing paper A2 passes through the position of conveyance roller pair 44, the nip roller 44B nips with respect to the driving roller 44A (see FIGS. 7H and 7I). Namely, after the leading edge of the photographic printing paper A2 passes through the respective positions of the pressing roller 50C and the conveyance roller pair 44, the photographic printing paper A2 is pressed and nipped. Thus, transmission of vibration to the photographic printing paper A2 which is being exposed and floating of the photographic printing paper A2 can be suppressed and flatness of the photographic printing paper A2 can be ensured. In this way, image recording can be performed with high precision.

Specifically, a driving motor (not shown) is driven so as to rotate the eccentric cam 62C from the released position to the pressing position. Thus, the pressing roller 50C presses the photographic printing paper A2 (see FIG. 7H). Free leading edge of the photographic printing paper A2 is rapidly pressed in a vicinity of the exposure position and its floating can be prevented. The leading edge of the photographic printing paper A2 is guided between the conveyance roller pair 44 by the guide member 80C. Further, the eccentric cam 62C is rotated from the pressing position to the nip position and the photographic printing paper A2 is nipped by the nip roller 44B and the driving roller 44A (see FIGS. 7H and 7I).

Pressing of the pressing roller 50A is released before the trailing edge of the photographic printing paper A2 passes through the pressing roller 50A (see FIG. 7I). Specifically, a driving motor is driven so as to move the eccentric cam 62A from the pressing position to the released position, so that pressing of the pressing roller 50A is released. This is in order to prevent an impact generated by the trailing edge of the photographic printing paper A2 being removed from the pressing roller 50A from affecting an exposure state of the photographic printing paper A2. Further, since the guide member 80A provided at the swing member 64A is moved away from the flutter guide 48 in accordance with releasing of pressing of the pressing roller 50A (in accordance with rotation of the swing member 64A), it is possible to prevent that the trailing edge of the photographic printing paper A2 with its pressing by the pressing roller 50A being released slide-contacts the guide member 80A and such slide contact affects the exposure state of the photographic printing paper A2.

Further, before the leading edge of the photographic printing paper A2 reaches the respective positions of the pressing roller 50D and the conveyance roller pair 46, nipping of the conveyance roller pair 46 is released and the pressing roller 50D and the guide member 80D are retracted from their pressing positions to their released positions (see FIG. 7I). This is in order to prevent generation of exposure unevenness caused by impact (vibration) generated by the leading edge of the photographic printing paper A2 abutting the pressing roller 50D and the guide member 80D at their pressing positions and nipping conveyance roller pair 46, because when the leading edge of the photographic printing paper A2 reaches the positions of the pressing roller 50D and the conveyance roller pair 46, the photographic printing paper A2 is being exposed.

Figure 8J:
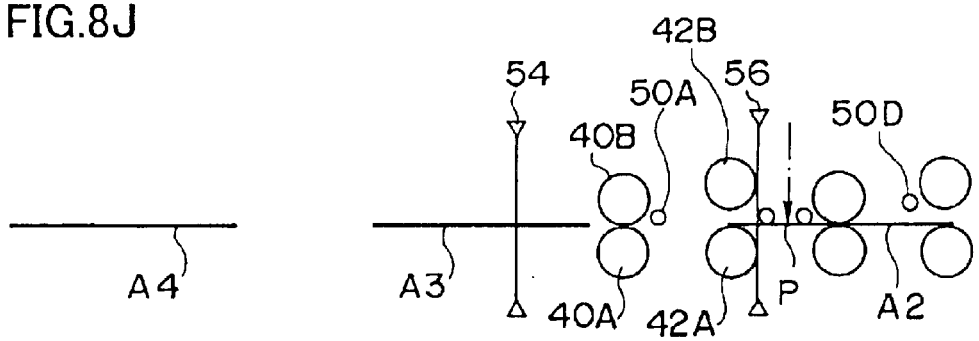
FIGS. 8J through 8M are explanatory views showing states of controlling nip of the conveyance roller pairs in the sub-scanning-and-conveying section.

Further, nipping of the conveyance roller pair 42 is released before the trailing edge of the photographic printing paper A2 passes through the conveyance roller pair 42 (see FIG. 8J). This is in order to prevent that the photographic printing paper A2 is vibrated by an impact generated by the trailing edge of the photographic printing paper A2 being removed from nipping conveyance roller pair 42, and such vibration affects the exposure state. Specifically, a driving motor is driven so as to move the eccentric cam 62B from the nip position to the pressing position. In this way, nipping of the nip roller 42B is released.

Here, pressing of the pressing roller 50B is not released at this timing (see FIG. 8J). This is in order to ensure flatness of the photographic printing paper A2 (prevent floating of the photographic printing paper A2) at the exposure position by pressing the photographic printing paper A2 until the very limit of timing.

Figure 8K:
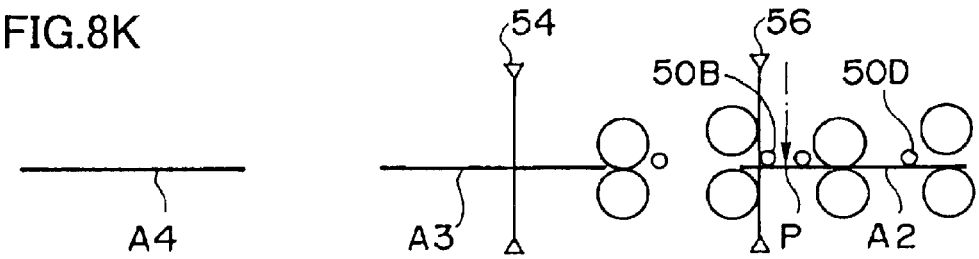
Figure 8L:
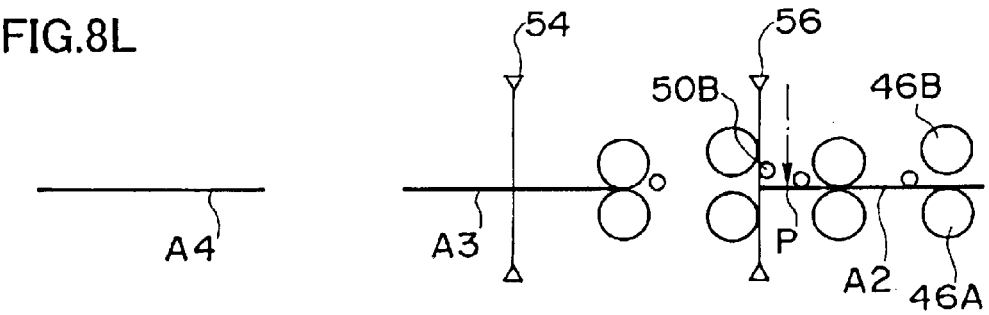

Then, when the leading edge of the photographic printing paper A2 passes through the pressing roller 50D, the pressing roller 50D presses the photographic printing paper A2 against the flutter guide 48 and floating of the photographic printing paper A2 and transmission of vibration thereof can be prevented (see FIG. 8K).

Further, a driving motor is driven so as to move the eccentric cam 62B from the pressing position to the released position. Thus, the pressing roller 50B is moved away from the flutter guide 48 before the trailing edge of the photographic printing paper A2 reaches the pressing roller 50B (see FIG. 8L). This is in order to prevent that when the trailing edge of the photographic printing paper A2 passes through the pressing roller 50B while pressed by the pressing roller 50B against the flutter guide 48, and the trailing edge of the photographic printing paper A2 is removed from the pressing roller 50B, the trailing edge of the photographic printing paper A2 released from restriction of the pressing roller 50B is curled up and the photographic printing paper A2 is vibrated at the exposure position, and thus exposure unevenness may occur. At this time, by the guide member 80B being moved away from the flutter guide 48 integrally with the pressing roller 50B, it is possible to prevent the trailing edge of the photographic printing paper A2 with its pressing being released from slide-contacting the guide member 80B and affecting the exposure state of the photographic printing paper A2.

Figure 8M:
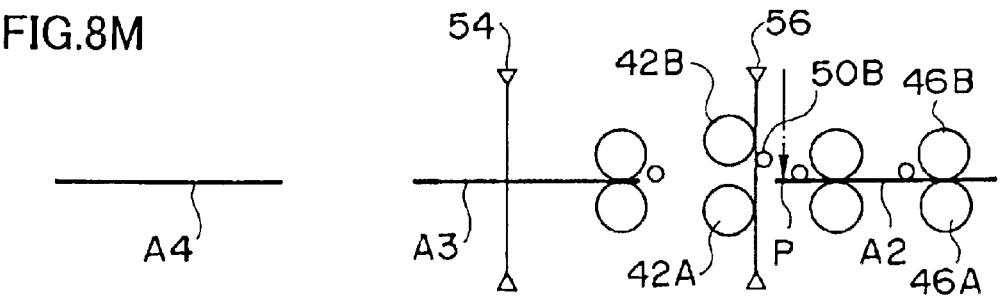

When the leading edge of the photographic printing paper A2 passes through the position of conveyance roller pair 46 (when exposure for the photographic printing paper A2 ends), the nip roller 46B and the driving roller 46A nip the photographic printing paper A2, apply a load to the photographic printing paper A2 and securely convey the same (see FIG. 8M).

As described above, in accordance with the image recording device 12 of this embodiment, the conveyance roller pair 42 disposed immediately before the exposure position is provided with the pressing roller 50B further toward the exposure position side than the conveyance roller pair 42. Similarly, the conveyance roller pair 44 disposed immediately after the exposure position is provided with the pressing roller 50C further toward the exposure position than the conveyance roller pair 44. The pressing rollers 50B and 50C can press the photographic printing paper A integrally with the conveyance roller pairs 42 and 44 or separately from them. Thus, floating of the photographic printing paper A in a vicinity of the exposure position is prevented and flatness thereof is ensured. Further, exposure without unevenness can be performed and excellent image recording can be performed.

The leading edge of the photographic printing paper A is securely guided under the pressing rollers 50A and 50B by the guide members 80A and 80B. Further, the leading edge of the photographic printing paper A is reliably guided between the conveyance roller pairs 44 and 46 by the guide members 80C and 80D. Thus, conveyance of the photographic printing paper A is stabilized.

In accordance with the image recording device 12 of this embodiment, the conveyance roller pairs 44 and 46 disposed further toward the conveyance direction downstream side than the exposure position P through which the leading edge of the photographic printing paper A being exposed passes is release their nipping before the leading edge of the photographic printing paper A passes therethrough. Similarly, pressing of the pressing rollers 50C and 50D disposed further toward the conveyance direction downstream side than the exposure position P is released in advance before the leading edge of the photographic printing paper A passes therethrough. Then, the conveyance roller pairs 44 and 46 nip after the leading edge of the photographic printing paper A passes therethrough, and the pressing rollers 50C and 50D press the photographic printing paper A after the leading edge of the photographic printing paper A passes therethrough. Thus, it is possible to prevent that the photographic printing paper A is vibrated by impact generated by the leading edge of the photographic printing paper A entering nipping conveyance roller pairs 44 and 46 or the pressing rollers 50C and 50D pressed against the flutter guide 48 and thus exposure unevenness occurs. At this time, the guide members 80C and 80D are moved away from the flutter guide 48 together with the pressing rollers 50C and SOD, and thus it is possible to prevent the leading edge of floating photographic printing paper A from slide-contacting the guide members 80C and 80D and affecting exposure state of the photographic printing paper A.

The conveyance roller pairs 40 and 42 disposed further toward the conveyance direction upstream side than the exposure position P through which the trailing edge of the photographic printing paper A being exposed passes is release their nipping before the trailing edge thereof passes therethrough. Similarly, the pressing rollers 50A and 50B disposed further toward the conveyance direction upstream side than the exposure position P is release their pressing before the trailing edge of the photographic printing paper A passes therethrough. Thus, it is possible to prevent that the photographic printing paper A is vibrated by impact generated by the trailing edge of the photographic printing paper A being removed from nipping conveyance roller pairs 40 and 42 or the pressing rollers 50A and 50B abutting the flutter guide 48, and thus exposure unevenness occurs. At this time, since the guide members 80A and 80B are moved away from the flutter guide 48 together with the pressing rollers 50A and 50B, it is possible to prevent the trailing edge of the photographic printing paper A with its restriction by the pressing rollers 50A and 50B being released from slide-contacting the guide members 80A and 80B and affecting the exposure state of the photographic printing paper A.

Especially the nip releasing mechanisms 58B and 58C can press the photographic printing paper A only by the pressing rollers 50B and 50C, separately from nip-releasing of the conveyance roller pairs 42 and 44. Thus, even if nipping of the photographic printing paper A being exposed by the conveyance roller pair 42 or 44 is released in order to prevent aforementioned impact, the pressing roller 50B or 50C presses the trailing edge or the leading edge of the photographic printing paper until the very limit of timing and thus flatness of the photographic printing paper A in a vicinity of the exposure position can be successfully ensured. Consequently, excellent image recording can be performed.

In accordance with this embodiment, although the pressing rollers 50A to 50D are used as members for pressing the photographic printing paper A, the invention is not limited to the rollers. For example, a member formed in a plate shape may be used as long as its surface slide-contacting the photographic printing paper A has low slide friction and is coated with tetrafluoroethylene (TEFLON: trade name of E. I. Dupont de Nemours and Company) which does not damage an emulsion surface of the photographic printing paper A.

(Second Embodiment)

An image recording device relating to a second embodiment of the invention will be described. The same components as those of the first embodiment are denoted by the same reference numerals, and descriptions thereof will be omitted. Because only the sub-scanning-and-conveying section 28 is different from the first embodiment, it will be described.

Figure 9:
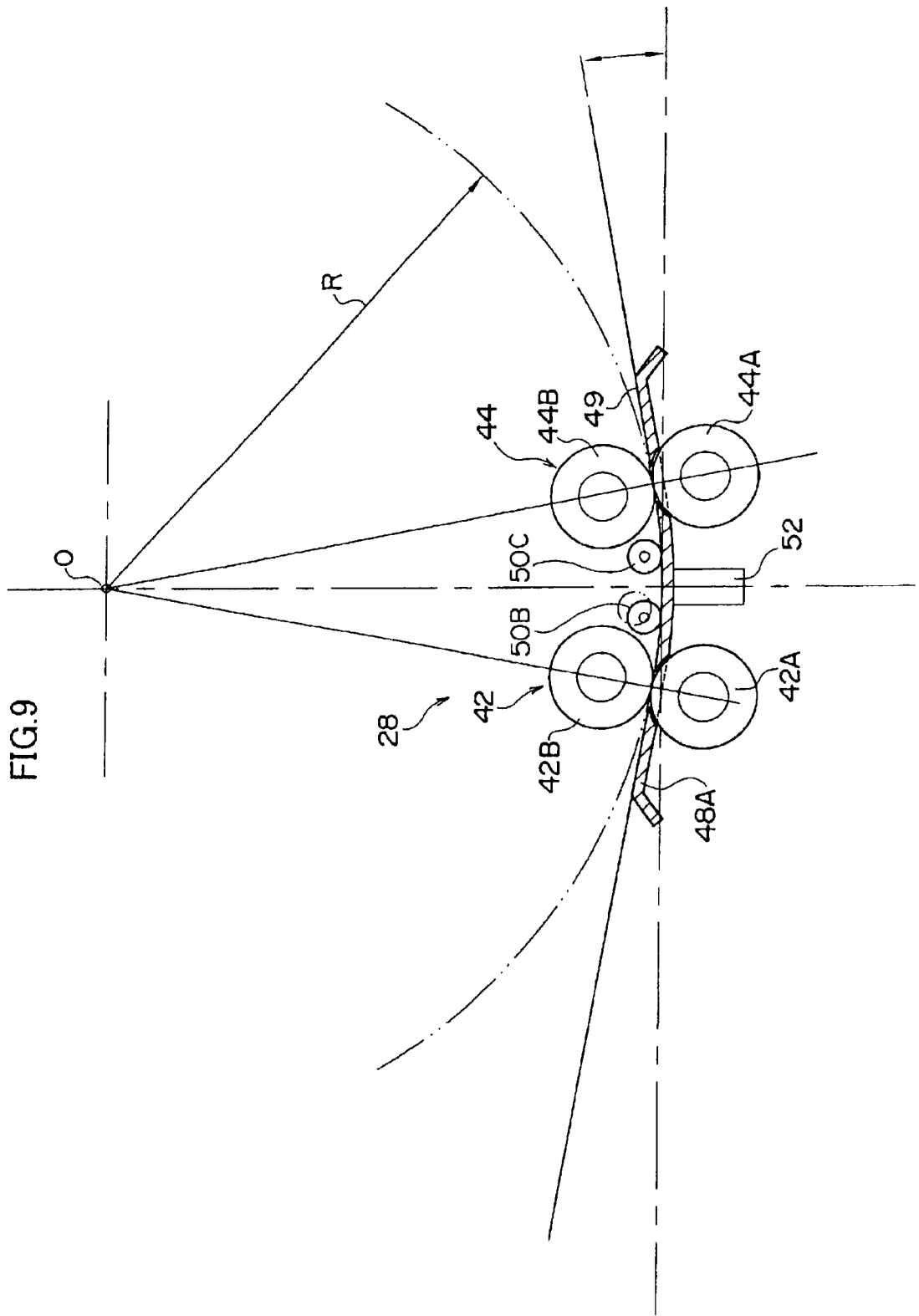
FIG. 9 is an explanatory view of state of nip-releasing in the sub-scanning-and-conveying section relating to a second embodiment of the invention.
Figure 10:
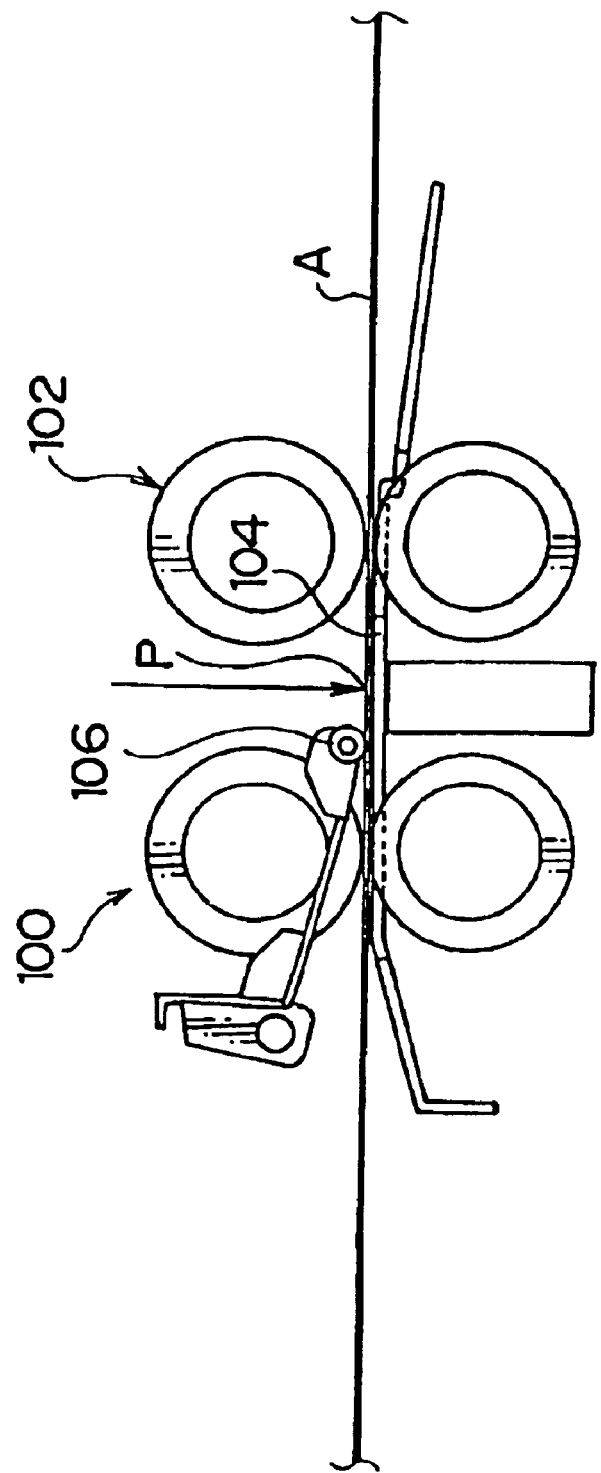
FIG. 10 is a schematic side view of conventional sub-scanning-and-conveying section.

As shown in FIG. 9, in the sub-scanning-and-conveying section 28, a conveying path for photographic printing paper A is curved in a substantially arc-shaped configuration. Namely, a support surface 49 of the guide 48A which supports a back surface of the photographic printing paper A is, as seen from the side, curved in a substantially arc-shaped configuration protruding downward. Due to the substantially arc-shaped configuration, portions of the support surface 49 around the exposure position (portion between conveyance roller pairs 42 and 44) are curved but opposite sides thereof (in and out of the page, as shown in FIG. 9) are formed in substantial linear configuration.

Further, the nip roller 42B and the driving roller 42A are disposed such that a line connecting a center of rotation of the nip roller 42B to a center of rotation of the driving roller 42A passes through a center O of a circle defined by the arc of the substantially arc-shaped support surface 49. Namely, the conveyance roller pair 42 is disposed such that its nip direction is perpendicular to the substantially arc-shaped conveyance direction at it's point of contact with the support surface 49. The conveyance roller pair 44 is disposed by the same manner as that of the conveyance roller pair 42.

The image recording device with such structure has the same effects as those of first embodiment. Further, when reversely curled photographic printing paper A (the photographic printing paper A with its back surface side protruding) enters the sub-scanning-and-conveying section 28, the photographic printing paper A is pressed, by the pressing rollers 50B and 50C, against the support surface 49 of the guide 48A which has a substantially arc-shaped configuration protruding toward the same side as the side that the photographic printing paper A is reversely curled, and exposed with light while conveyed along the support surface 49. Thus, its flatness at the exposure position P is easily ensured and excellent image recording can be also ensured.

Especially if the same conveyance control as in the first embodiment is performed at a time when the leading edge of the photographic printing paper A passes through the exposure position, the photographic printing paper A is pressed only by nipping of the conveyance roller pair 42 disposed further toward the conveyance direction upstream side than the exposure position is and the pressing roller 50B. Thus, the leading edge of the photographic printing paper A further toward the conveyance direction downstream side than the exposure position P is even further floated because of its reverse curl, resulting in exposure unevenness. Nevertheless, since the photographic printing paper A is conveyed along the guide 48A with substantially arc-shaped configuration (support surface 49), an amount of floating of the photographic printing paper A at the exposure position P is suppressed and exposure unevenness is also suppressed.

Figure 5:
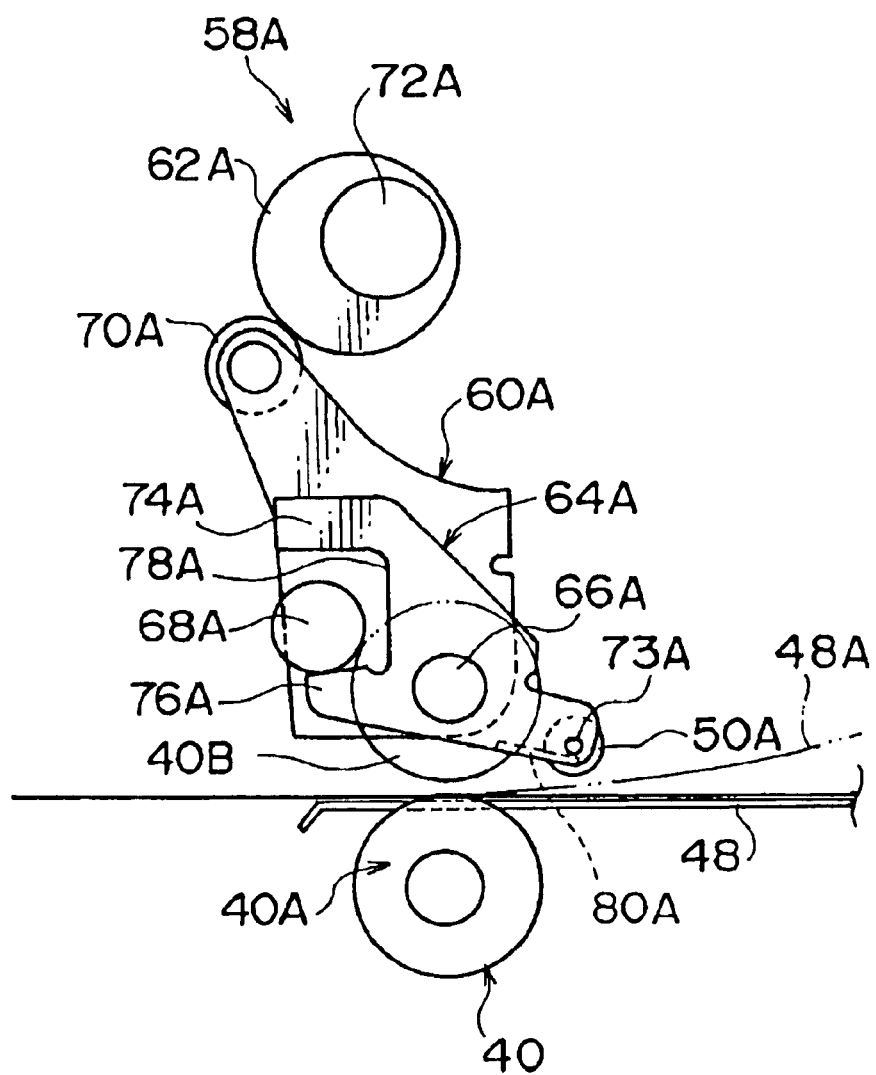
FIG. 5 is a schematic side view showing a state of nip-releasing of nip releasing mechanism relating to the first embodiment of the invention.

When the same nip releasing mechanism as in the first embodiment is used, because a nip direction coincides a radial direction toward a center of the conveying path with substantially arc-shaped configuration (circular arc), an amount that the pressing roller 50B is moved away from the photographic printing paper A (guide 48A) by the nip releasing mechanism 58B is minimized (see two-dot chain line 48A in FIG. 5). As a result, even if the pressing roller 50B is set apart from the photographic printing paper A, floating of the photographic printing paper A can be minimized.

Because of nip direction with the above-described structure, an amount of protruding of driving rollers 42A and 44A with respect to the guide 48A can be minimized. Further, an amount that the photographic printing paper A being conveyed advances over the driving rollers 42A and 44A can be suppressed, and vibration of the photographic printing paper A during its exposure can be also suppressed.

What is claimed is:

1. An image recording device for exposing a sheet of photosensitive material with light so as to record an image, the device comprising:

a plurality of conveyance roller pairs which are disposed upstream and downstream from an exposure position in a conveyance direction, and which nip and convey the photosensitive material so as to ensure flatness of the photosensitive material at the exposure position;

a support member that supports a back surface of the photosensitive material upstream and downstream from the exposure position;

a plurality of pressing members which are respectively disposed, at least, between a conveyance roller pair that is disposed immediately upstream from the exposure position and the exposure position, and between a conveyance roller pair that is disposed immediately downstream from the exposure position and the exposure position, and which presses the photosensitive material against the support member; and a release mechanism that causes nipping and release of nipping by at least one of the conveyance roller pairs and causes pressing and release of pressing by at least one of the pressing member.

2. An image recording device according to claim 1, wherein the release mechanism causes release of nipping by the conveyance roller pair disposed upstream from the exposure position in the conveyance direction and causes release of pressing by the pressing member disposed upstream from the exposure position in the conveyance direction before a trailing edge of the photosensitive material being exposed respectively reaches the conveyance roller pair and the pressing member.

3. An image recording device according to claim 2, wherein after the release mechanism causes release of nipping by the conveyance roller pair disposed upstream from the exposure position in the conveyance direction before the trailing edge of the photosensitive material being exposed reaches the conveyance roller pair, the pressing member disposed between the exposure position and the conveyance roller pair presses the photosensitive material on the support member.

4. An image recording device according to claim 1, wherein the release mechanism causes release of nipping by the conveyance roller pair disposed downstream from the exposure position in the conveyance direction and causes release of pressing by the pressing member disposed downstream from the exposure position in the conveyance direction before a leading edge of the photosensitive material being exposed respectively reaches the conveyance roller pair and the pressing member.

5. An image recording device according to claim 4, wherein in accordance with the release mechanism, before the conveyance roller pair disposed downstream from the exposure position in the conveyance direction nips the photosensitive material, the pressing member disposed between the exposure position and the conveyance roller pair, which the leading edge of the photosensitive material has reached, presses the photosensitive material on the support member.

6. An image recording device according to claim 1 further comprising a guide member that is disposed in a vicinity of each pressing member, prevents the photosensitive material from rising up, guides the photosensitive material under the pressing member or between the conveyance roller pair, and is moved integrally with the pressing member by the release mechanism.

7. An image recording device according to claim 1, wherein each pressing member comprises a rotatable roller that abuts an image recording surface of the photosensitive material and presses the same against the support member.

8. An image recording device according to claim 1, wherein each pressing member comprises a pressing surface that abuts an image recording surface of the photosensitive material and presses the same against the support member which supports a back surface of the photosensitive material, and the pressing surface is formed of a member having low slide friction.

9. The image recording device according to claim 1, further comprising:
- at least one light transmitting sensor which detects a leading edge and a trailing edge of the photosensitive material;
- a control mechanism which controls the release mechanism on the basis of a signal from the at least one light transmitting sensor.

10. An image recording device for exposing a sheet of photosensitive material with light so as to record an image, the device comprising:
- a plurality of conveyance roller pairs which are disposed upstream and downstream from an exposure position in a conveyance direction, and which nip the photosensitive material and convey the same;
- a support member that supports a back surface of the photosensitive material upstream and downstream from the exposure position;
- a plurality of pressing members which are respectively disposed, at least, between a conveyance roller pair that is disposed immediately upstream from the exposure position and the exposure position, and between a conveyance roller pair that is disposed immediately downstream from the exposure position and the exposure position, and which presses the photosensitive material against the support member; and
- a release mechanism that causes nipping and release of nipping by at least one of the conveyance roller pairs and causes pressing and release of pressing by at least one of the pressing members,
- wherein the support member has a support surface which supports a back surface of the photosensitive material is curved inward in a conveyance direction.

11. An image recording device according to claim 10, wherein a direction of release of nipping the conveyance roller pair is directed in a normal direction with respect to the support surface.

12. An image recording device according to claim 10, wherein the release mechanism causes release of nipping by the conveyance roller pair disposed upstream from the exposure position in the conveyance direction and causes release of pressing by the pressing member disposed upstream from the exposure position in the conveyance direction before a trailing edge of the photosensitive material being exposed respectively reaches the conveyance roller pair and the pressing member.

13. An image recording device according to claim 12, wherein after the release mechanism causes release of nipping by the conveyance roller pair disposed upstream from the exposure position in the conveyance direction before the trailing edge of the photosensitive material being exposed reaches the conveyance roller pair, the pressing member disposed between the exposure position and the conveyance roller pair presses the photosensitive material on the support member.

14. An image recording device according to claim 10, wherein the release mechanism causes release of nipping by the conveyance roller pair disposed downstream from the exposure position in the conveyance direction and causes release of pressing by the pressing member disposed downstream from the exposure position in the conveyance direction before a leading edge of the photosensitive material being exposed respectively reaches the conveyance roller pair and the pressing member.

15. An image recording device according to claim 14, wherein in accordance with the release mechanism, before the conveyance roller pair disposed downstream from the exposure position in the conveyance direction nips the photosensitive material, the pressing member disposed between the exposure position and the conveyance roller pair, which the leading edge of the photosensitive material has reached, presses the photosensitive material on the support member.

16. An image recording device according to claim 10, further comprising a guide member that is disposed in a vicinity of each pressing member, prevents the photosensitive material from rising up, guides the photosensitive material under the pressing member or between the conveyance roller pair, and is moved integrally with the pressing member by the release mechanism.

17. An image recording device according to claim 10, wherein each pressing member comprises a rotatable roller that abuts an image recording surface of the photosensitive material and presses the same against the support member.

18. An image recording device according to claim 10, wherein each pressing member comprises a pressing surface that abuts an image recording surface of the photosensitive material and presses the same against the support member which supports a back surface of the photosensitive material, and the pressing surface is formed of a member having low slide friction.

19. An image recording device for exposing photosensitive material with light, comprising:
- a guide which supports the photosensitive material;
- at least one upstream conveyance device disposed in an upstream direction relative to the conveyance direction of the photosensitive material;
- at least one downstream conveyance device disposed in an downstream direction relative to the conveyance direction of the photosensitive material; and
- an exposure device disposed at an exposure position between said at least one upstream conveyance device and said at least one downstream conveyance device;
- wherein each of said at least one upstream conveyance device and said at least one downstream conveyance device comprise:
  - a roller pair having a released position and a closed position in which said roller pair nips and conveys the photosensitive material; and
  - a pressing member, disposed between said roller pair and the exposure position, having a released position and a pressing position in which said pressing member presses the photosensitive material to said guide.

20. The image recording device according to claim 19, wherein:
- said roller pair of each of said at least one upstream conveyance device is switched from a closed position to a released position prior to a trailing edge of said photosensitive material passing through said roller pair.

21. The image recording device according to claim 20, wherein:
- said pressing member of said at least one upstream conveyance device is switched from a pressing position to a released position after said roller pair is switched from a closed position to a released position and prior to a trailing edge of said photosensitive material passing under said pressing member.

22. The image recording device according to claim 19, wherein:

said roller pair of said at least one downstream conveyance device is switched from a released position to a closed position after a leading edge of said photosensitive material passes through said roller pair.

23. The image recording device according to claim 22, wherein:

said pressing member of said at least one downstream conveyance device is switched from a released position to a pressing position after a leading edge of said photosensitive material passes under said pressing member and before said roller pair is switched from a released position to a closed position.

24. The image recording device according to claim 19, wherein said pressing member comprises a rotatable roller.

25. The image recording device according to claim 19, wherein said pressing member comprises a pressing surface having low slide friction.

26. The image recording device according to claim 19, wherein said guide is substantially arc-shaped.

* * * * *